United States Patent [19]

Bruno et al.

[11] Patent Number: 4,848,146
[45] Date of Patent: Jul. 18, 1989

[54] UNDERWATER ELECTROMAGNETIC TUBULENT VELOCIMETER

[76] Inventors: Anthony B. Bruno, 34 Wayne Dr., East Lyme, Conn. 06333; Rolf G. Kasper, 35 Oakridge Dr., Old Lyme, Conn. 06371

[21] Appl. No.: 224,834

[22] Filed: Jul. 21, 1988

[51] Int. Cl.$^4$ .......................... G01C 21/10; G01F 1/58
[52] U.S. Cl. ..................................... 73/181; 73/861.15
[58] Field of Search ................. 73/181, 861.15, 861.13

[56] References Cited

U.S. PATENT DOCUMENTS

| | | | |
|---|---|---|---|
| 3,119,960 | 1/1964 | Kenyon | 73/181 |
| 3,161,047 | 12/1964 | Griswold | 73/181 |
| 3,693,439 | 9/1972 | Cushing | 73/181 |
| 3,777,561 | 12/1973 | Lewis | 73/181 |
| 4,261,210 | 4/1981 | Gardner | 73/181 |
| 4,472,966 | 9/1984 | Dumestre III | 73/181 |
| 4,653,319 | 3/1987 | Parsonage | 73/181 |

Primary Examiner—Donald O. Woodiel
Attorney, Agent, or Firm—Arthur A. McGill; Prithvi C. Lall; Michael J. McGowan

[57] ABSTRACT

A velocimeter, comprising a controlled magnetic field source and electric field sensors, the device being flush mounted in a vessel hull. The magnetic source comprises a drive coil which may be energized with either a DC current or an AC current at varous desired frequencies. The turns-area product and applied current are selected based on desired sensitivity. When the drive coil is energized, a uniform magnetic field is produced near the surface of, and normal to, the hull. The thickness of the uniform region is governed by the thickness of the boundary layer in the tubulent region. The magnetic field returns through the vessel hull structure in such a way that div$\overline{B}$=0. Inside the coil, near the outboard external surface of the device, a pair of orthogonally disposed electric field sensors are located for measuring the electric field produced as a result of the interaction between the magnetic field and the conductive fluid. The sensors utilize the Lorentz force which develops in the presence of a magnetic field and a moving conductive field. Sensor output is then further processed to extract the tangential velocity components.

8 Claims, 1 Drawing Sheet

UNDERWATER ELECTROMAGNETIC TUBULENT VELOCIMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a velocity measuring device and more particularly to a device for measuring the tangential turbulent velocity structure just above the surface of a vehicle moving in a conductive fluid medium.

(2) Description of the Prior Art

It is well known that the turbulent flow region around a body moving through a fluid exhibits a three dimensional velocity structure. Several techniques for measuring this velocity structure are currently available. These techniques generally include intrusive devices, e.g., hot wire anemometers, Pitot tubes, AC and DC electric and magnetic sensors, and propellers. The fluid velocity structure can also be measured in three dimensions for scale model structures with a Laser Doppler Velocimeter (LDV). However, the LDV is generally used externally to measure fluid velocity in a laboratory water tunnel or the like. It is not practical, however, to use a LDV on a full size, seagoing vessel as the LDV would have to be mounted outboard of, and close to, the hull of the vessel. What is required is a device which overcomes the inherent difficulties associated with earlier fluid velocity measurement techniques and which also allows measurement of the tangential velocity components of a full size vessel under real at-sea operating conditions.

SUMMARY OF THE INVENTION

Accordingly, it is a general purpose and object of the present invention to provide a device for measuring the tangential turbulent velocity structure just above the external hull surface of a vehicle moving through a conductive fluid medium.

It is a further object that such device simultaneously measure both components of the tangential fluid velocity, i.e., the flow velocity and the transverse velocity.

Another object is that such device not extend out into the fluid medium, since protruding sensing devices are known to produce undesired perturbations in the local velocity structure in the vicinity of the sensing device.

Still another object is that such measuring device be rugged so as to be capable of withstanding the demanding marine environment extant on the exterior hull of any moving vessel.

These objects are accomplished with the present invention by providing a velocimeter comprising a controlled magnetic field source and an electric field sensor, the device being then flush mounted into the hull of a vessel. The magnetic source comprises a drive coil formed of several turns of wire which may be energized with either a DC current or an AC current at various desired frequencies. When the drive coil for the source is energized, a uniform magnetic field is produced near the surface of the structure. This uniform magnetic field points in a direction normal to the vessel hull. Because the intent of the device is to measure velocity components in the turbulent boundary layer, the region of uniform magnetic field need only be as thick as the boundary layer thickness. However, the device is not limited to measurement of turbulent velocity components and can be made to measure free stream velocity by increasing the strength of the magnetic field such that the region of magnetic uniformity extends beyond the turbulent boundary layer. Conversely, by decreasing the magnetic field intensity such that the region of uniformity extends only into the viscous sublayer structure of a general turbulent flow field, velocity components can be measured within the viscous sublayer. The principal flow regions of interest, i.e., turbulent region, transition region, and laminar region, are well known and are as defined by H. Schlichting in "Boundary Layer Theory", McGraw-Hill, NY, NY 1979, pp. 24–26. The magnetic field $\overline{B}$ returns through the vessel hull structure in such a way that the divergence of the impressed magnetic field ($\mathrm{div}\overline{B}=0$), i.e., where the number of flux lines that enter a unit volume of space is equal to the number of flux lines that leave the space. This return magnetic field will be such as to have no effect upon the operation of the sensor. Inside the coil, near the outboard external surface of the device, a pair of orthogonally arranged electric field sensors are located for measuring the electric field produced as a result of the interaction between the magnetic field and the conductive fluid. The sensors utilize the well known Lorentz force which develops in the presence of a magnetic field and a moving conductive fluid. The sensor electrical outputs are then further signal processed to extract the tangential velocity components.

BRIEF DESCRIPTION OF THE DRAWINGS

A more complete understanding of the invention and many of the attendant advantages thereto will be readily appreciated as the sam becomes better understood by reference to the following detailed description when considered in conjunction with the accompanying drawings wherein.

DESCRIPTION OF THE PREFERRED EMBODIMENTS

Figure 1:
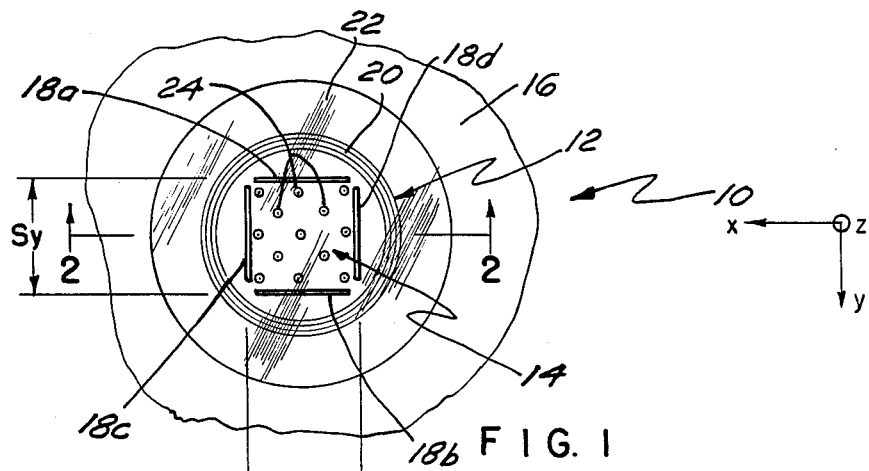
FIG. 1 shows a plan view of a measuring device built according to the teachings of the present invention.

Referring now to FIG. 1 there is shown an underwater Electromagnetic Turbulent Velocimeter (ETV) 10 comprising a controllable, magnetic field producing, source means 12 and an electric field sensing means 14, ETV 10 being shown flush-mounted into a vessel hull structure 16. Controllable source means 12 includes a coil of conductive wire 20, which may be copper or the like, is energized with a DC current or an AC current at various desired frequencies. The turns-area product and applied current level are determined based on the desired sensitivity of the sensor. When drive coil 20 for controllable source means 12 is energized, a uniform magnetic field of flux lines 24 is produced near the exterior surface of a cylindrical epoxy polymer plug 22, which plug serves to encapsulate remaining ETV 10 components. It is noted that plug 22 has one surface thereof mounted flush with the external surface of hull 16 and, while it is shown in FIG. 1 as transparent, it need not be so. This magnetic field points in the normal direction with respect to the exterior plug surface. The thickness of the region of uniformity is determined by the thickness of the boundary layer in the turbulent region. This thickness can vary from 1 mm to approximately 10 cm. The produced magnetic field returns through hull structure 16 in such a way that the "divergence" of the vector magnetic field (div$\bar{B}$)=0. It noted, however, that this return magnetic field through hull 16 has no effect on the velocity measuring operation of the sensor.

Inside wire coil 20, near the external surface of plug 22, two electric field sensing electrode pairs, 18a and b, and 18c and d, are disposed so as to measure the corresponding proportional electric field produced by the interaction of the produced magnetic field and the moving conductive fluid. The electrode pairs can be metal strips which are formed as part of a deposited semi-conductor impedance matching network. Electrode shape is not critical; flat plates of metal foil as well as cylindrical wires are examples of suitable electrodes. Electrode pair 18a and 18b are aligned in parallel and spaced a distance $S_y$ apart. Electrode pair 18c and 18d are aligned in parallel and spaced a corresponding distance $S_x$ apart where $S_x=S_y$, and positioned generally orthogonal to pair 18a and 18b, thereby forming a square. Sensing means 14 utilizes the well known Lorentz force which develops due to the interaction of a magnetic field and a moving conductive fluid. This interaction is expressed mathematically as a cross product, i.e., $$\bar{E} = \bar{v} \times \bar{B} \quad \text{(Eq. 1)}$$

where
$\bar{v}$ is the three dimensional turbulent velocity,
$\bar{B}$ is the impressed magnetic field and,
$\bar{E}$ is the measured electric field.

When the cross product of Eq. 1 is expanded, the resulting equations form an indeterminate set, that is, three independent measurements of the x, y, and z components of $\bar{E}$ cannot be solved with respect to the three components $v_x$, $v_y$, $v_z$ of the turbulent velocity field. The situation is resolved by introducing an impressed uniform magnetic field which has a very much greater magnitude than the earth's magnetic field and which points in a direction normal to the turbulent velocity field. The cross product expansion equations then reduce to, $$E_x = v_y B_z \quad \text{(Eq. 2)}$$

and $$E_y = v_x B_z. \quad \text{(Eq. 2)}$$

Equations 2 and 3 are now solved for the flow velocity, $v_x$, and the transverse velocity, $v_y$. If the flow velocity and the transverse velocity each have spectral components, the corresponding electric field will have the same spectral components.

Figure 2:
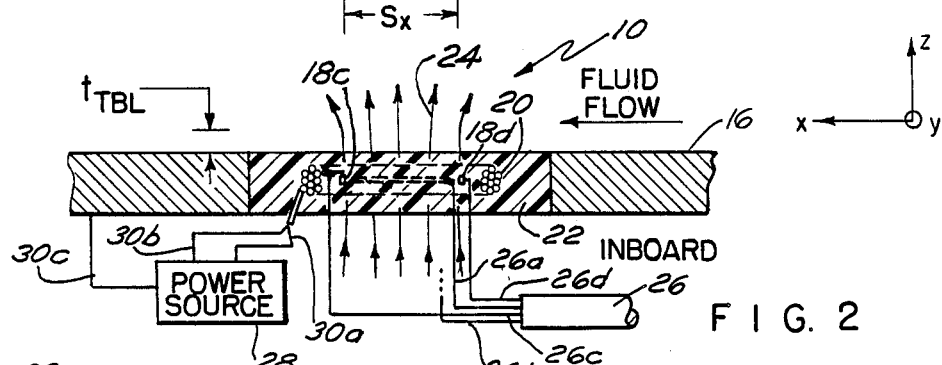
FIG. 2 shows a cross-sectional view taken along line 2—2 of FIG. 1.

Sensor 14 and drive coil 20 are shown in detail in the cross-sectional view of FIG. 2. Wire drive coil 20 is embedded in a cylindrical plug 22 of epoxy polymer. Plug 22 is flush-mounted in vessel hull 16. Fluid flows over hull 16 and over flush device 10. In so doing the fluid forms a turbulent flow structure having a thickness $t_{TBL}$. Electrode pairs 18a and b, and 18c and d are positioned coaxial with, and potted within, wire coil 20. The electrode pairs are electrically connected to a cable 26. Leads 26a, b, c, and d of cable 26 are connected to corresponding electrodes 18a, b, c and d respectively. A power source 28 provides AC or DC power as desired to coil 20 through leads 30a and 30b. The power supply 28 is grounded to hull 16 through return path lead 30C. When coil 20 receives power from supply 28 a uniform magnetic field, represented by flux lines 24, is induced which, at least in the TBL region of thickness $t_{TBL}$, is orthogonal to the direction of fluid flow.

Figure 3:
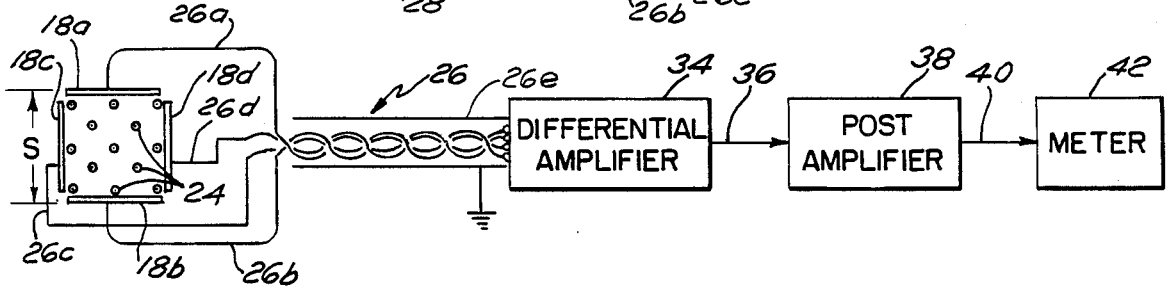
FIG. 3 shows a block diagram of a typical electrical measuring circuit, for use in conjunction with the device of FIG. 1.

FIG. 3 shows a block diagram of a typical electronics system which can be used for measuring the electric field. Leads 26a, b, c, and d connect to electrodes 18a, b, c and d respectively at one end, pass through cable 26, and connect at the other ends thereof to a differential amplifier 34. Differential amplifier 34 includes, at its input end, well known impedance matching means (not shown) which provide an impedance match between electrode pairs 18a and b, and 18c and d, and also includes a two channel semiconductor front end. Such a two channel differential amplifier can provide a fixed signal gain of 20 dB per channel. Differential amplifier 34 also provides a DC bias block such that DC electrode potentials produced by the magnetic source do not influence electric field signals. The output of amplifier 34 is transmitted over cable 36 to a post amplifier 38. Post amplifier 38 provides selectable gain stages of 20, 40 or 60 dB per channel. The amplified output of post amplifier 38 is then fed by cable 40 to a meter 42 which displays the measured electric field strength.

An advantage of the present design of the electromagnetic turbulent velocimeter arises out of the unique application of a well known physical principle, that, is, an electric field exists due to the interaction of a moving conductive fluid in a magnetic field. The relationship defined by Eqs. 2 and 3 exists between the electric field and the corresponding velocity components. A known magnetic field is generated such that the normal component of the control field dominates the components of the earth's field (approximately 0.5 Gauss). Therefore, the fluid velocity can be deduced from a measurement of the induced electric field by solving Eq. 2 and 3. In terms of parameters used in FIG. 1, the velocity components can be deduced from:

$$v_x = \frac{|E_y|}{|B_z|} = \frac{v_y}{|B_z|S_y} \quad \text{(Eq. 4)}$$

and $$v_y = \frac{|E_x|}{|B_z|} = \frac{v_x}{|B_z|S_x} \quad \text{(Eq. 5)}$$

where $v_x$ and $v_y$ are the measured voltage outputs of meter 42, referenced to electrodes 18a and b, and electrodes 18c and d. The entire sensing apparatus is mounted in and flush with the outer surface of the vessel hull. No part of the device protrudes into the fluid. Therefore, the electromagnetic turbulent velocimeter measures the true tangential velocity components of the turbulent flow near the vessel surface. In addition, the accuracy of the device depends only upon the sensitivity of the electronics and the accuracy of the control field. Both of these values can be readily determined and do not depend upon the properties of the fluid nor are they dependent upon local conditions, i.e., temperature, pressure, fluid density, position of sensor, etc.

Finally, the electromagnetic turbulent velocimeter can be used on moving vessels to accurately measure turbulent flow velocity vectors at the sensor sites.

What has thus been described is a velocimeter comprising a controlled magnetics field source and an electric field sensor, the device being then flush mounted into the hull of a vessel. The magnetic source comprises a drive coil formed of several turns of wire which may be energized with either a DC current or an AC current at various desired frequencies. The turns-area product and the applied current are selected based on the desired sensitivity of the sensor. When the drive coil for the source is energized, a uniform magnetic field is produced near the surface of the structure. This uniform magnetic field points in a direction normal to the vessel hull. The thickness of the region of uniformity is governed by the thickness of the boundary layer in the turbulent region. The magnetic field returns through the vessel hull structure in such a way that $\text{div}\overline{B}=0$. Inside the coil, near the outboard external surface of the device, a pair of orthogonally arranged electric field sensors are located for measuring the electric field produced as a result of the interaction between the magnetic field and the conductive fluid. The sensors utilize the Lorentz force which develops in the presence of a magnetic field and a moving conductive fluid. The sensor output is then further processed to extract the tangential velocity components.

Figure 4:
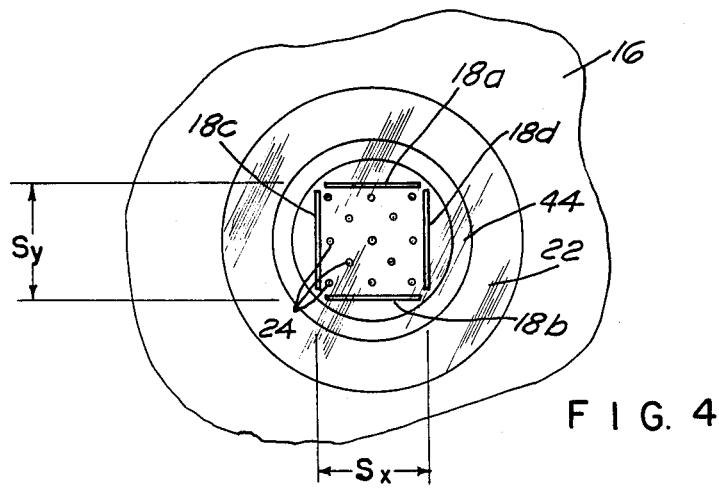
FIG. 4 shows an alternate arrangement of the device of FIG. 1.

Obviously many modifications and variations of the present invention may become apparent in light of the above teachings. For example: An alternative approach would be to use a permanent magnet as the controlled magnetic source in lieu of coil 20 of FIG. 2. However, the permanent magnet would have to be in the shape of an annulus and the interior of the annulus would have to be filled with a dielectric. FIG. 4 shows a plan view of such a permanent magnet configuration of the device of FIG. 1. In this embodiment the magnetic field above permanent magnet 44 would have to be computed numerically because simple formulas for determining the field of permanent magnets are not available due to the extant multi-metallic surroundings of a vessel hull. Also, the accuracy of the device would be dependent upon knowing the magnetic properties, i.e., the permeability and the B-H curve for the particular material. These properties are usually known or can be measured for specific geometries, such as a toroidal geometry. In other cases these properties are extremely difficult to measure and are thus subject to error. Such a permanent magnet based device might also be susceptible to saturation. It is also noted that the shape and number of turns of coil 20 of FIG. 2 may be varied as desired as may the material selected for the wire. It is further noted that $S_x$ does not have to equal $S_y$ but can form other geometric relationships. The placement of multiple sensors on a hull, when integrated, will provide a gross velocity measurement of the vessel itself.

In light of the above, it is therefore understood that within the scope of the appended claims, the invention may be practiced otherwise than as specifically described.

What is claimed is:

1. An apparatus for measuring the tangential velocity components $v_x$ and $v_y$ in the turbulent boundary layer of the flow field of a conductive fluid moving over a vessel hull, comprising:

magnetic field generating means, for producing a plurality of magnetic flux lines, extending outboard normal to said hull at least into said turbulent boundary layer and returning through said hull such that $\text{div}\,\overline{B}=0$;

electric field sensing means, coaxial with and disposed within said magnetic field generating means, for providing electrical output signals proportional to variations in said magnetic flux lines, said variations being produced by Lorentz forces;

potting means, surrounding and embedding said magnetic field generating means and said electric field sensing means, for mounting said apparatus in said hull; and electrical signal processing means, conductively attached to said electric field sensing means, for receiving said electrical output signals from said sensing means and providing readouts of said velocity components $v_x$ and $v_y$ therefrom.

2. An apparatus according to claim 1 wherein said electric field sensing means further comprises:

a first pair of electrodes, disposed parallel to one another and spaced a preselected distance $S_y$ apart, for sensing electric field variation signals in the flow direction due to said fluid velocity $v_x$;

a second pair of electrodes, disposed parallel to one another and spaced a preselected distance $S_x$ apart and oriented orthogonally with respect to said first pair of electrodes, for sensing electric field variation signals in the transverse direction due to said fluid velocity $v_y$; and electrical conductor means, having a plurality of conductors, one each conductor being connected to one each electrode of said first and second electrode pairs, for receiving said electric field variation signals and transmitting said signals to said electrical signal processing means.

3. An apparatus according to claim 2 wherein said electrical signal processing means further comprises:

a differential amplifier, conductively attached to said electrical conductor means, for receiving said signals transmitted therethrough and producing a two-channel output therefrom;

a post amplifier, conductively attached to said differential amplifier, for receiving said two-channel output therefrom and further selectively amplifying said two-channel output; and an electrical meter, conductively attached to the output of said post amplifier, for receiving said amplified two-channel output of said post amplifier and producing a visual display of said tangential velocity components therefrom.

4. An apparatus according to claim 3 wherein said potting means further comprises an epoxy polymer.

5. An apparatus according to claim 4 wherein said magnetic field generating means further comprises:

a coil of conductive wire, having a preselected number of turns, for producing a magnetic field upon application of electric power; and power source means, conductively attached to said wire coil and said vessel hull, for providing said electric power.

6. An apparatus according to claim 5 wherein said power source means is a variable voltage DC source.

7. An apparatus according to claim 5 wherein said power source means is a variable voltage AC source further having variable frequency control.

8. An apparatus according to claim 4 wherein said magnetic field generating means further comprises a permanent magnet of toroidal shape.

* * * * *

UNITED STATES PATENT AND TRADEMARK OFFICE
CERTIFICATE OF CORRECTION

PATENT NO. : 4,848,146

DATED : Jul. 18, 1989

INVENTOR(S) : ANTHONY B. BRUNO
ROLF G. KASPER

It is certified that error appears in the above-identified patent and that said Letters Patent is hereby corrected as shown below:

On the first page, at

[54] Change "TUBULENT" to --TURBULENT--.

Signed and Sealed this

Twenty-second Day of May, 1990

*Attest:*

HARRY F. MANBECK, JR.

*Attesting Officer*  *Commissioner of Patents and Trademarks*